US010048905B2

(12) United States Patent
Imai

(10) Patent No.: US 10,048,905 B2
(45) Date of Patent: Aug. 14, 2018

(54) INTERACTIVE DISPLAY METHOD AND INTERACTIVE DISPLAY DEVICE

(71) Applicant: SEIKO EPSON CORPORATION, Tokyo (JP)

(72) Inventor: Shun Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 31 days.

(21) Appl. No.: 15/125,755

(22) PCT Filed: Mar. 30, 2015

(86) PCT No.: PCT/JP2015/001844
§ 371 (c)(1),
(2) Date: Sep. 13, 2016

(87) PCT Pub. No.: WO2015/151505
PCT Pub. Date: Oct. 8, 2015

(65) Prior Publication Data
US 2017/0003919 A1 Jan. 5, 2017

(30) Foreign Application Priority Data

Apr. 1, 2014 (JP) ................................. 2014-075191
Apr. 1, 2014 (JP) ................................. 2014-075195

(51) Int. Cl.
G06F 3/12 (2006.01)
G06F 3/041 (2006.01)
(Continued)

(52) U.S. Cl.
CPC .......... G06F 3/1219 (2013.01); G06F 3/0304 (2013.01); G06F 3/041 (2013.01);
(Continued)

(58) Field of Classification Search
CPC ...... G06F 3/041; G06F 3/0416; G06F 3/0488; G06F 1/1639; G06F 1/1645
(Continued)

(56) References Cited

U.S. PATENT DOCUMENTS 7,633,654 B2   12/2009  Morichika
2005/0068419 A1  3/2005  Morichika
(Continued)

FOREIGN PATENT DOCUMENTS

JP    H10-319488 A    12/1998
JP    2002-196736 A   7/2002
(Continued)

OTHER PUBLICATIONS

Apr. 28, 2015 International Search Report issued in International Patent Application No. PCT/JP2015/001844.
UNiSYS NT Emulator Shiyo Guide MC Hen, Nihon Unisys Ltd., pp. 4-30, 1995.

Primary Examiner — Jamares Q Washington
(74) Attorney, Agent, or Firm — Oliff PLC

(57) ABSTRACT

An interactive display method includes an image signal input step of receiving an image signal from an external apparatus, a display step of displaying an image on a screen on the basis of a display signal, an operation detection step of detecting an operation for an operation region of the screen, a region setting step of setting a rectangle, in which an external image based on the image signal is accommodated and of which at least one side overlaps a side of the external image, as the operation region according to the external image, and a drawing step of outputting the display signal for displaying the external image.

19 Claims, 9 Drawing Sheets

(51) Int. Cl.
*H04N 9/31* (2006.01)
*G06F 3/0488* (2013.01)
*G06F 3/03* (2006.01)

(52) U.S. Cl.
CPC ........ *G06F 3/0488* (2013.01); *G06F 3/04886* (2013.01); *G06F 3/1215* (2013.01); *G06F 3/1256* (2013.01); *H04N 9/3185* (2013.01); *H04N 9/3194* (2013.01)

(58) Field of Classification Search
USPC ....... 358/1.13, 3.21; 345/173; 715/210, 273, 715/764
See application file for complete search history.

(56) References Cited

U.S. PATENT DOCUMENTS

2009/0033888 A1   2/2009   Nozaki et al.
2011/0107222 A1*  5/2011   Uchida ................ G06F 3/0425
                                                  715/730

FOREIGN PATENT DOCUMENTS

| JP | 2005-109978 A | 4/2005 |
| JP | 2007-078808 A | 3/2007 |
| JP | 2010-139686 A | 6/2010 |
| JP | 2011-097336 A | 5/2011 |
| JP | 2013-097354 A | 5/2013 |

* cited by examiner

INTERACTIVE DISPLAY METHOD AND INTERACTIVE DISPLAY DEVICE

TECHNICAL FIELD

The present invention relates to an interactive display method and an interactive display device.

BACKGROUND ART

In recent years, a device has been used which is provided with a touch panel display and receives an operation for a screen. In addition, even in a projection display device, such as a projector, a function that receives an operation for a screen using, for example, an infrared light curtain has been implemented.

When a region (operation region) that receives an operation for a screen is set, it is preferable that the user easily recognizes the set operation region as the operation region. In a case in which an external image that has an aspect ratio different from that of a screen is displayed, there is a region in which the external image is not disposed on the screen, as described in PTL 1. In general, the outside of the region in which the external image is not disposed is drawn in black in order to improve visibility.

CITATION LIST

Patent Literature

[PTL 1] JP-A-2013-97354
[PTL 2] JP-A-2002-196736

SUMMARY OF INVENTION

Technical Problem

However, in the projector, when the outside of the region in which the external image is not disposed is drawn as black pixels, it is difficult to recognize the boundary between the region that is projected as black pixels by the projector and a region other than the region in which pixels are projected by the projector on a projection surface. Therefore, when the region in which the external image is not disposed in the entire region in which pixels are projected by the projector is set as the operation region, it is difficult to recognize the boundary of the operation region on the projection surface. In addition, in a case in which a plurality of external images are displayed on the projection surface, when the region in which the external images are not disposed is set as the operation region, it is more difficult for the user to recognize the operation region. When the region in which the external image is not disposed is set as the operation region, it is more difficult for the user to recognize the operation region even in a case in which the operation region is changed by switching between external image input sources.

In an interactive projector, when a region behind an external image is drawn in black, the user is likely to misunderstand that an operation for the black region behind the external image is not reflected in a projection image. In a case in which a composite image of the external image and an object corresponding to an operation for the region behind the external image is printed, a large amount of ink or toner is consumed in order to print the black region behind the external image and the print time increases.

The invention has been made in order to solve the above-mentioned problems and an object of the invention is to make it easy for a user to recognize a region, in which an operation for a screen is reflected in the screen, on the screen.

Solution to Problem (1) An interactive display method for achieving the object includes an receiving an image signal from an external apparatus, displaying an image on a screen on the basis of a display signal, detecting an operation for an operation region of the screen, setting a rectangle, in which an external image based on the image signal is accommodated and of which at least one side overlaps a side of the external image, as the operation region according to the external image, and outputting the display signal for displaying the external image.

According to the invention, since the boundary of the operation region is a rectangle whose sides can be assumed as the extension lines of the sides of the external image, it is easy for the user to recognize the operation region on the screen. A rectangular region of which only one side overlaps one side of the external image may be set as the operation region. A rectangular region of which two adjacent sides overlap two adjacent sides of the external image (that is, the regions have one common vertex) may be set as the operation region. A rectangular region of which three sides overlap three sides of the external image may be set as the operation region. A rectangular region that is equal to the region of the external image may be set as the operation region.

(2) In the interactive display method for achieving the object, in the outputting of the display signal, a boundary of the operation region may be drawn and the display signal for displaying the boundary and the external image may be output.

For example, in a case in which the operation region and a region outside the operation region are drawn in the same color, the boundary line of the operation region is drawn in a different color, which makes it easy for the user to recognize the operation region on the screen. For example, pixels inside and outside the operation region may have different colors. In this case, even if the boundary of the operation region is drawn, it is easier for the user to recognize the operation region on the screen.

(3) In the interactive display method for achieving the object, in the outputting of the display signal, an operation input object corresponding to an operation for the operation region may be drawn and the display signal for displaying the operation input object and the external image may be output.

According to this structure, for example, comments on the displayed external image and the external image can be displayed by an operation of the user through the screen.

(4) In the interactive display method for achieving the object, in a case in which the external apparatus that inputs the image signal is switched, in setting of the rectangle, the operation region may be reset.

According to this structure, it is easy for the user to recognize the operation region on the projection surface even if the external apparatus is switched and the aspect ratio of the external image is changed or even if a screen configuration is changed such that a plurality of external images are displayed side by side according to the number of external apparatuses that input image signals.

(5) In the interactive display method for achieving the object, in the setting of the rectangle, the external image may be disposed in a rectangular template region and a rectangle of which at least one side overlaps a side of the template region may be set as the operation region.

The aspect ratio of the screen of an information processing device is diversified every year. According to this structure, it is possible to reduce the number of types of operation regions which are set according to the external image rather than the number of types of aspect ratios of the external apparatuses which input image signals. Therefore, it is easy for the user to recognize the operation region on the projection surface.

(6) The interactive display method for achieving the object may further include changing a mode from a first mode in which the external image is projected to a second mode in which an operation input object corresponding to an operation for the operation region is drawn and the operation input object and the external image are projected. In the displaying of the image, in the second mode, the image in which a projection form of a region behind the external image in the operation region is different from that in the first mode may be displayed.

According to this structure, in the second mode in which the external image and the operation input object are projected, the projection form of the region behind the external image in the operation region is different from that in the first mode. Therefore, it is easy for the user to recognize the region, in which an operation for the screen is reflected, on the screen.

(7) An interactive display device for achieving the object includes an image signal input unit that receives an image signal from an external apparatus, a display unit that displays an image on a screen on the basis of a display signal, an operation detection unit that detects an operation for an operation region of the screen, a region setting unit that sets a rectangle, in which an external image based on the image signal is accommodated and of which at least one side overlaps a side of the external image, as the operation region according to the external image, and a drawing unit that outputs the display signal for displaying the external image.

According to the invention, since the boundary of the operation region is a rectangle whose sides can be assumed as the extension lines of the sides of the external image, it is easy for the user to recognize the operation region on the screen. A rectangular region of which only one side overlaps one side of the external image may be set as the operation region. A rectangular region of which two adjacent sides overlap two adjacent sides of the external image (that is, the regions have one common vertex) may be set as the operation region. A rectangular region of which three sides overlap three sides of the external image may be set as the operation region. A rectangular region that is equal to the region of the external image may be set as the operation region.

(8) The interactive display device for achieving the object may further include a control unit that changes a mode from a first mode in which the external image is projected to a second mode in which the external image is combined with an operation input object corresponding to an operation for the operation region and the combined image is projected. In the second mode, the control unit may draw the image in which a projection form of a region behind the external image in the operation region is different from that in the first mode.

According to this structure, in the second mode in which the external image and the operation input object are projected, the projection form of the region behind the external image in the operation region is different from that in the first mode. Therefore, it is easy for the user to recognize the region, in which an operation for the screen is reflected, on the screen.

(9) In the interactive display device for achieving the object, in the second mode, the control unit may draw the image in which the color of the region behind the external image is white.

According to this structure, in the second mode, the color of the region behind the external image in the operation region is white that reminds the user of a white board or white paper. Therefore, it is easier for the user to recognize the region, in which an operation for the screen is reflected, on the screen.

(10) The interactive display device for achieving the object may further include a printing instruction input unit that inputs a printing instruction. In the second mode, when the printing instruction is input, the control unit may output print data for printing the image in which the color of the region behind the external image is white.

(11) In the second mode, when the printing instruction is input, the control unit may output print data for printing the image in which the region behind the external image has a color in which a print duty of the region behind the external image is lower than that in the first mode.

According to these structures, it is possible to reduce the amount of ink or toner consumed when a projection image is printed and to reduce the print time.

(12) In the interactive display device for achieving the object, when the mode is changed from the first mode to the second mode, the control unit may change the projection form of the region behind the external image from the first mode.

According to this structure, with a change to the second mode, the projection form of the region behind the external image in the operation region is changed. Therefore, it is easier for the user to recognize the region, in which an operation for the projection surface is reflected in the projection image, on the projection surface.

(13) In the interactive display device for achieving the object, the image signal input unit may include a USB terminal. When a connection to the USB terminal is detected, the control unit may change the projection form of the region behind the external image from the first mode.

For example, there is a case in which a personal computer (PC) is connected to the USB terminal and a pen-type device having a function of detecting an operation for a projection surface of a projector functions as an input device such as a pointing device of the PC. In this case, according to this structure, it is possible to reduce the number of operations required to the user to change the projection form of the region behind the external image in the operation region.

(14) The interactive display device for achieving the object may further include a change instruction detection unit that detects a change instruction to change the mode from the first mode to the second mode. When the change instruction is detected, the control unit may change the projection form of the region behind the external image from the first mode.

According to this structure, when the mode is changed to the second mode, the projection form of the region behind the external image in the operation region is automatically changed. Therefore, it is possible to reduce the number of operations required to the user to change the projection form of the region behind the external image in the operation region.

(15) In the interactive display device for achieving the object, the change instruction detection unit may detect an operation for a predetermined region of the screen as the change instruction.

According to this structure, the projection form of the region behind the external image in the operation region can be changed by an operation for the projection surface. Therefore, the convenience of use is improved.

(16) In the interactive display device for achieving the object, the change instruction detection unit may include a switch that detects the change instruction.

According to this structure, when the mode is changed to the second mode, the projection form of the region behind the external image in the operation region is automatically changed. Therefore, it is possible to reduce the number of operations required to the user to change the projection form of the region behind the external image in the operation region.

(17) In the interactive display device for achieving the object, the operation detection unit may include a transmitting unit that transmits an operation signal when contact with the screen is made, a receiving unit that receives the operation signal, and a position detection unit that detects a position of the transmitting unit when the operation signal is received. The switch may be provided in the transmitting unit.

According to this structure, the user can change the projection form of the region behind the external image in the operation region without moving away from the projection surface. Therefore, the convenience of use is improved.

(18) In the interactive display device for achieving the object, the switch may be a power switch of the transmitting unit.

According to this structure, it is possible to reduce the number of operations required to the user to change the projection form of the region behind the external image in the operation region.

(19) In the interactive display device for achieving the object, the switch may be an operation switch of an OSD menu.

According to this structure, when the mode is changed to the second mode, the projection form of the region behind the external image in the operation region is automatically changed. Therefore, it is possible to reduce the number of operations required to the user to change the projection form of the region behind the external image in the operation region.

The invention can also be applied to an interactive display device. The functions of each unit described in the claims are implemented by hardware resources whose functions are specified by their own structures, hardware resources whose functions are specified by a program, or a combination thereof. The invention is not limited to the structure in which the functions of each unit are implemented by the hardware resources which are physically independent.

DESCRIPTION OF EMBODIMENTS

Figure 1A:
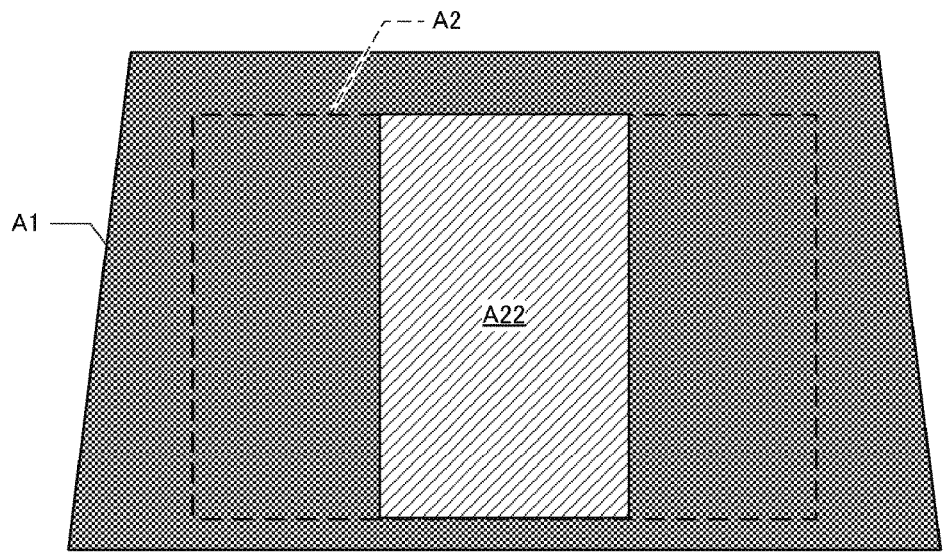
FIG. 1 is a diagram illustrating the structure of a screen according to an embodiment of the invention.

Hereinafter, embodiments of the invention will be described with reference to the accompanying drawings. However, in the drawings, corresponding components are denoted by the same reference numerals and the description thereof will not be repeated.

1. Outline

A projector 1 as an example of an interactive display device according to the invention is a device that projects and displays an image on a projection surface, such as a wall, a desk, or a dedicated screen, as a screen. The projector 1 operates in a first mode in which an external image based on an image signal that is input from an external apparatus, such as a PC or a smart phone, is projected and a second mode in which the external image and an operation input image corresponding to an operation for the projection surface are projected.

As illustrated in FIG. 1A, in the first mode, a window image A2 having an external image A22 disposed therein is projected and both the color of a region behind the window image A2 in a projection region A1 and the color of a region behind the external image A22 in the window image A2 are black. Here, the window image is an image of a maximum region which is projected in a rectangular shape on the projection surface by the projector. In a case in which the distances from a projection light source to positions on the projection surface are different from each other, even if a rectangular image is drawn in the projector, an image similar to the rectangular image is not formed on the projection surface. The image which is adjusted to a rectangular shape on the projection surface is the window image.

Figure 1B:
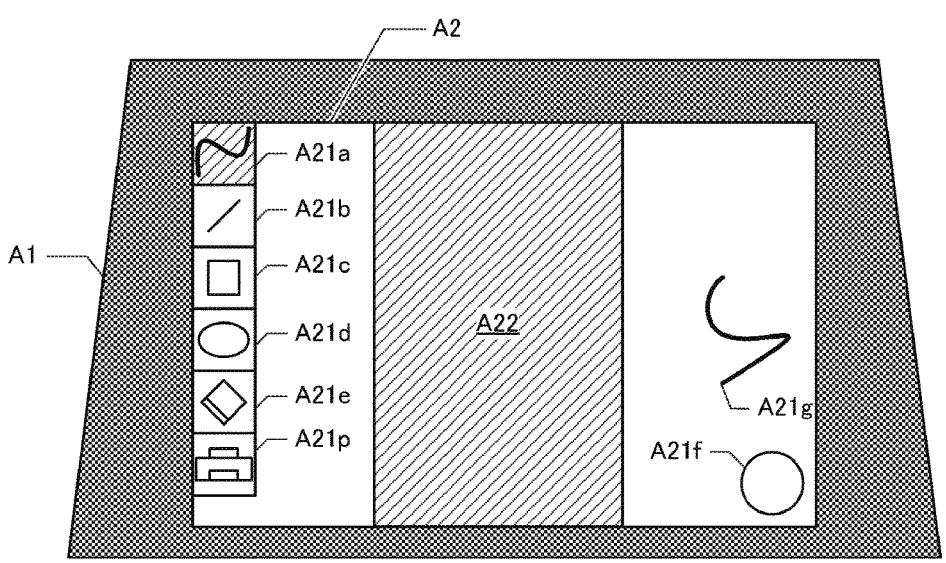

As illustrated in FIG. 1B, in the second mode, the external image A22 and an operation input image A21 including an operation input object A21g, such as a curve, are disposed so as to overlap each other. In the second mode, the color of the region behind the window image A2 in the projection region A1 is black which is the same as that in the first mode and the color of the region behind the external image A22 in the window image A2 is white which is different from that in the first mode. In addition, since the color of the region behind the window image A2 in the projection region A1 is black and the color of the region behind the external image A22 in the window image A2 is white, the entire region of the window image A2 which has four sides of the window image A2 as boundary lines may be recognized as an operation region. In the second mode, when an operation for the operation region is detected, the projector 1 draws the operation input object A21g, such as a curve corresponding to the trajectory of the operation, and projects the operation input object A21g. As such, the operation region is projected in different forms in the first mode and the second mode and the boundary lines of the operation region are displayed. Therefore, it is easy for the user to recognize a region, in which an operation for the projection surface is reflected in a projection image, on the projection surface.

The projector 1 may have a function of outputting print data for printing the window image A2. In the first mode, the external image A22 is a print target. In the second mode, since the operation input object A21g is also disposed outside the external image A22, the external image A22 is also a print target. In the second mode, when a printing instruction is input, print data in which the color of the region behind the external image A22 in the window image A2 is white is output. Therefore, it is possible to reduce the amount of ink or toner consumed when a projection image is printed and to reduce the print time.

In the second mode, when an operation for the operation region is detected, the projector 1 draws the operation input object A21g corresponding to the trajectory of the operation and projects the operation input object A21g. The operation region is set in a rectangular region (the entire region of the window image A2 in the example illustrated in FIG. 1B) in which the external input image A22 is accommodated and which has two sides that overlap two sides of the external input image A22. Therefore, it can be assumed that the boundary lines of the operation region are on the extension lines of the sides of the external image A22. As a result, it is easy for the user to recognize a region, in which an operation for the projection surface is reflected in a projection image, on the projection surface.

2. Structure of Projector

Figure 2:
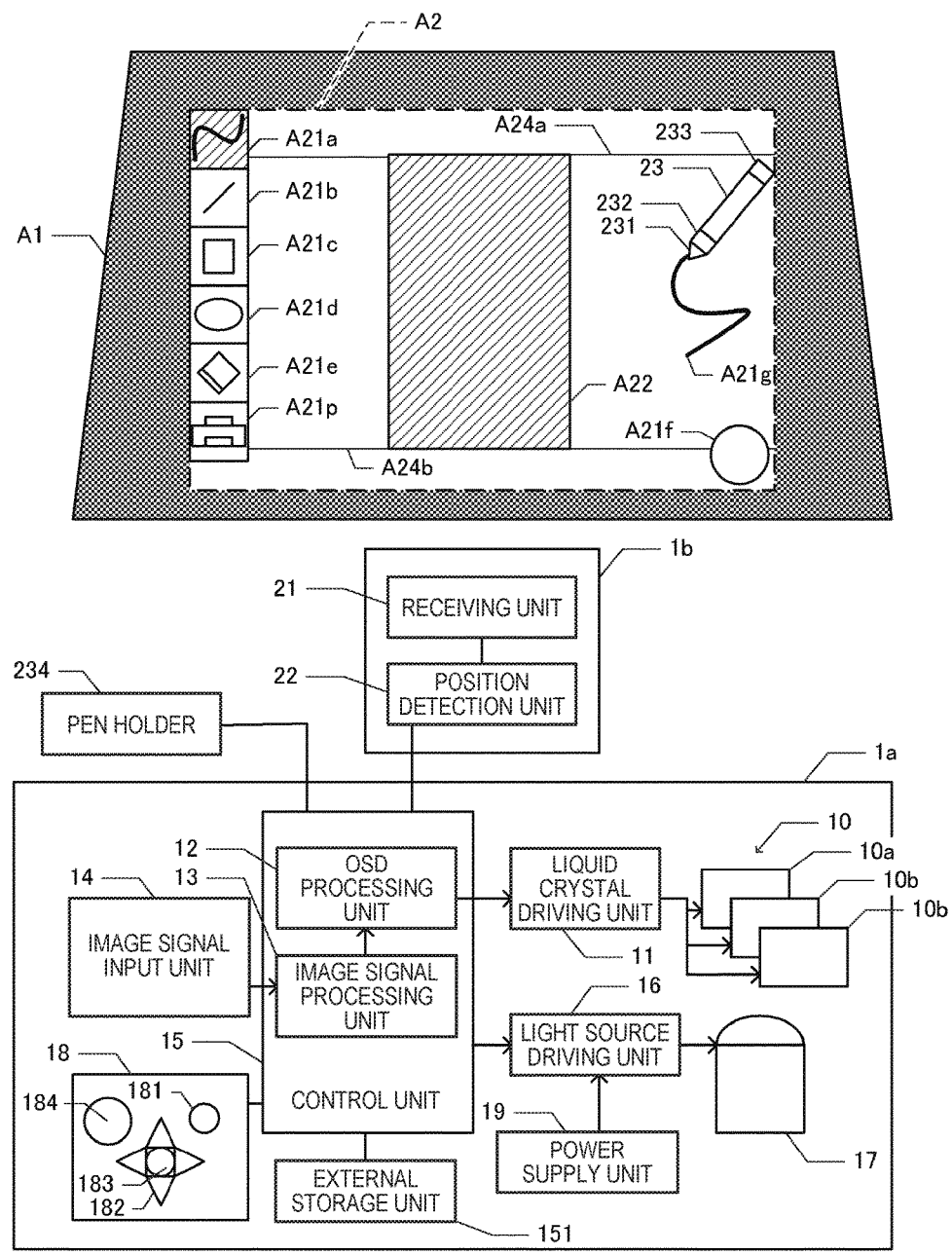
FIG. 2 is a block diagram illustrating the embodiment of the invention

As illustrated in FIG. 2, the projector 1 includes a first housing 1a. The first housing 1a includes a light source driving unit 16, a projection light source 17, a liquid crystal light bulb 10, and a liquid crystal driving unit 11 as a display unit. In addition, the first housing 1a includes an image signal input unit 14, a control unit 15, an external storage unit 151, an operating unit 18, and a power supply unit 19. The projector 1 further includes a second housing 1b connected to the first housing 1a. The second housing 1b includes a receiving unit 21 and a position detection unit 22 as an operation detection unit. The projector 1 further includes an electronic pen 23 as a transmitting unit.

The projection light source 17 is, for example, a high-pressure mercury lamp, a light emitting diode (LED), or a laser and is driven by the light source driving unit 16. The image signal input unit 14 includes a plurality of types of input terminals, such as a USB terminal, an Ethernet (registered trademark) terminal, and an RS232c terminal, and receives various image signals from an external apparatus. The control unit 15 that functions as a region setting unit and a drawing unit executes a control program stored in the external storage unit 151 to control each unit of the projector 1. The control unit 15 includes an image signal processing unit 13 and an OSD processing unit 12, performs a drawing process on the basis of an image signal input from the external apparatus and an operation position signal input from the position detection unit 22, and outputs a projection signal as a display signal. The image signal processing unit 13 outputs window image data as the result of the drawing process based on the image signal input from the external apparatus and the operation position signal input from the position detection unit 22. The OSD processing unit 12 outputs a projection signal corresponding to the liquid crystal light bulb 10 on the basis of the window image data. The liquid crystal driving unit 11 converts the projection signal output from the OSD processing unit 12 into an analog signal for driving each pixel of the liquid crystal light bulb 10. The liquid crystal light bulb 10 includes three liquid crystal panels 10a, 10b, and 10c that control the transmittances of light components with red, green, and blue wavelengths, which have been emitted from the projection light source 17 and then separated by a dichroic mirror (not illustrated), for each pixel, respectively. The operating unit 18 that functions as a change instruction detection unit includes a menu key 181 for inputting an instruction to project an OSD menu, a selection key 182 for selecting OSD menu items, an Enter key 183, and a power switch 184 for turning on and off the supply of power from an external power supply to the power supply unit 19. The power supply unit 19 supplies power to each unit of the projector 1.

The receiving unit 21 is an infrared video camera that captures an image of the entire projection region A1, receives infrared-wavelength light, and outputs image data corresponding to the infrared-wavelength light emitted from the electronic pen 23 during the period for which the tip of the electronic pen 23 comes into contact with the projection surface in the projection region A1. The position detection unit 22 analyzes the image data output from the receiving unit 21 to detect the position where the infrared-wavelength light is emitted, that is, the position of the electronic pen 23, and outputs an operation position signal indicating the position of the electronic pen 23. The control unit 15 converts the operation position signal into the coordinates of the window image A2.

The electronic pen 23 includes a touch sensor 231, a light emitting unit 232, and a power switch 233 which are provided in a pen-type housing. The touch sensor 231 is provided at the tip of the electronic pen 23 and detects a contact state or a non-contact state with an object. The light emitting unit 232 is provided in the vicinity of the tip of the electronic pen 23 and emits infrared-wavelength light as an operation signal during the period for which the touch sensor 231 detects the contact state with the object. The power switch 233 is a switch for controlling the supply of power from a battery (not illustrated) to the touch sensor 231 and the light emitting unit 232. The power switch 233 is automatically turned on when the electronic pen 23 is detached from a pen holder 234 and when the electronic pen 23 is attached to the pen holder 234. The power switch 233 turns on the supply of power to the touch sensor 231 and the light emitting unit 232 when the pen holder 234 is detached from the electronic pen 23 and turns off the supply of power to the touch sensor 231 and the light emitting unit 232 when the pen holder 234 is attached from the electronic pen 23. The pen holder 234 includes a sensor (not illustrated) that detects a state in which the electronic pen 23 is detached and a state in which the electronic pen 23 is attached.

3. Interactive Projection Method 3-1. Setting of Region

First, the setting of the region in which the window image is drawn in the projection region, the region in which the external image is drawn in the window image, and the operation region in the window image will be described with reference to FIG. 3.

Figure 3:
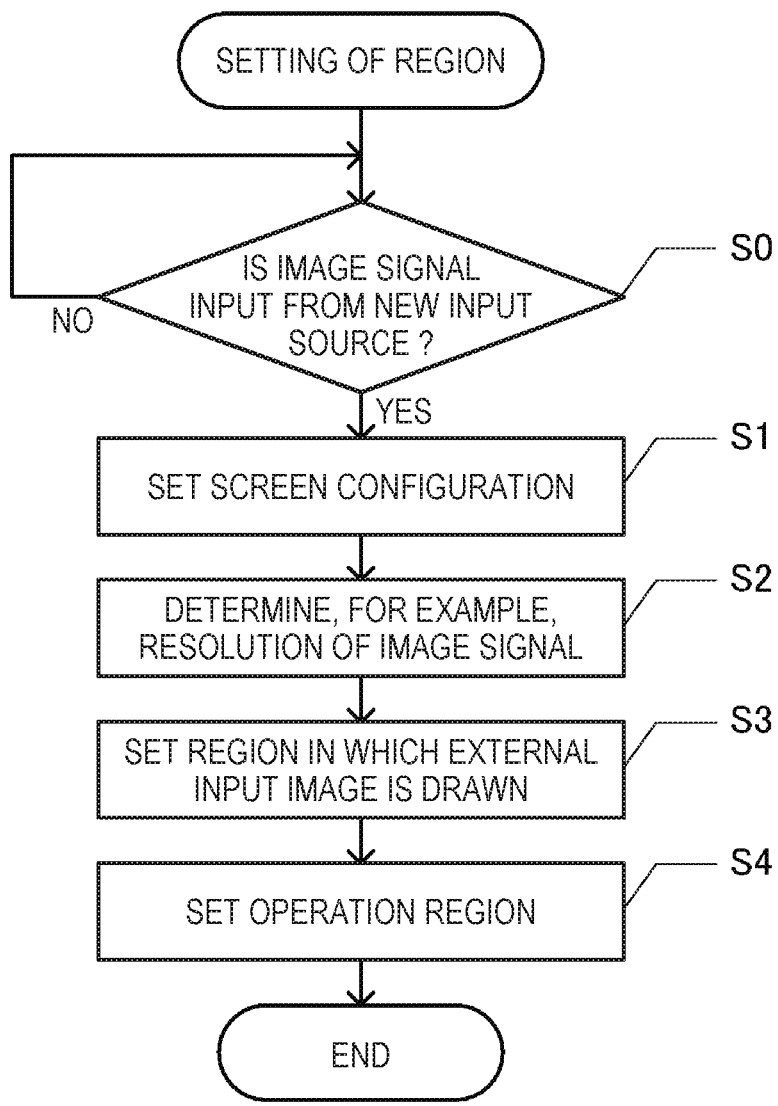
FIG. 3 is a flowchart according to the embodiment of the invention.

When an image signal is input from a new external apparatus to the image signal input unit 14, the control unit 15 starts a region setting process illustrated in FIG. 3 (S0). Specifically, when the image signal input unit 14 detects that an image signal starts to be input to an arbitrary input terminal, the control unit 15 starts the region setting process after Step S1. Therefore, in a case in which the external apparatus that inputs the image signal is switched, the drawing region and the operation region are reset.

When an image signal is input from a new external apparatus to the image signal input unit 14, the control unit 15 sets a screen configuration for how to dispose the external image in the window image (S1). In this embodiment, it is assumed that any one of one-screen display in which one external image is disposed at the center of the window image, two-screen equal division display in which the window image is divided into two equal regions in the horizontal direction and one external image is disposed in each region, and two-screen unequal division display in which the window image is divided into two unequal regions in the horizontal direction and one external image is disposed in each region can be set as the screen configuration. Specifically, the control unit 15 outputs a projection signal for projecting an OSD menu including options for the screen configuration that can be set and sets the screen configuration which is selected by the user through the operating unit 18.

Then, the control unit 15 determines a format such as the screen resolution of the image signal input to the image signal input unit 14 (S2).

Then, the control unit 15 sets the region in which the external image is drawn, on the basis of the screen configuration, the resolution of the image signal input to the image signal input unit 14, the resolution (real resolution) of an effective region of the liquid crystal light bulb 10, and a trapezoidal distortion correction value (S3). Specifically, the control unit 15 determines the region in which the window image is drawn in the projection region which is the maximum region that can be projected by the projector 1, on the basis of the resolution of the effective region of the liquid crystal light bulb 10 and the trapezoidal distortion correction value. In a case in which trapezoidal distortion correction is performed, the region in which the window image A2 is drawn is a non-rectangular region smaller than the projection region A1 which is the maximum region that can be projected by the projector 1, as represented by a dashed line A2s in FIG. 4C. The trapezoidal distortion correction value may be automatically set on the basis of the detection result of a projection state or may be set by the user through the OSD menu. The maximum region in which one external image can be drawn in the window image is determined by the screen configuration. In addition, the region in which the external image is drawn in the window image is determined on the basis of the aspect ratio of the maximum region and the aspect ratio of the external image. In this way, the region A2s in which the window image A2 is drawn in the projection region A1 is set and a region A22s in which the external image A22 is drawn in the window image A2 is set. The region in which the external image A22 is drawn in the projection region A1 corresponding to the effective region of the liquid crystal light bulb 10 is set. This will be described in detail below.

Then, the control unit 15 sets the operation region on the basis of the region in which the external image is drawn (S4). Specifically, a rectangular region in which two opposite sides of the region in which the external image is drawn overlap two opposite sides of the operation region and the other two opposite sides of the region in which the external image is drawn overlap two sides of the window image is set as the operation region. This will be described in detail below.

3-2. Drawing Process in First Mode

The control unit 15 draws an external image while enlarging or reducing the external image such that the resolution of the external image is equal to the resolution of the set drawing region, on the basis of the image signal input from the external apparatus.

In the first mode, the control unit 15 draws both the region behind the window image A2 in the projection region A1 and the region behind the external image in the window image A2 in black. In the first mode, the control unit 15 draws the projection region A1 in this way and outputs projection signals corresponding to the pixels forming the liquid crystal light bulb 10. As a result, in the first mode, as illustrated in FIG. 1A, a portion other than the external image A22 in the projection region A1 is projected in black. The dashed line A2 is a virtual line for indicating a region corresponding to the window image A2 and is not a line that is actually projected.

3-3. One-Screen Display

In a case in which a screen configuration for one-screen display is set and an image signal indicating an image that has the same aspect ratio as the window image is input, the control unit 15 sets the region in which the window image is drawn as the region in which the external image is drawn.

Figure 4A:
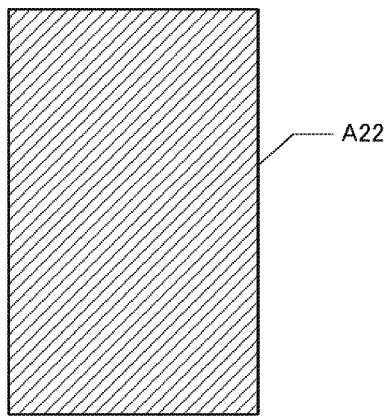
FIG. 4 is a diagram illustrating the structure of the screen according to the embodiment of the invention.
Figure 4B:
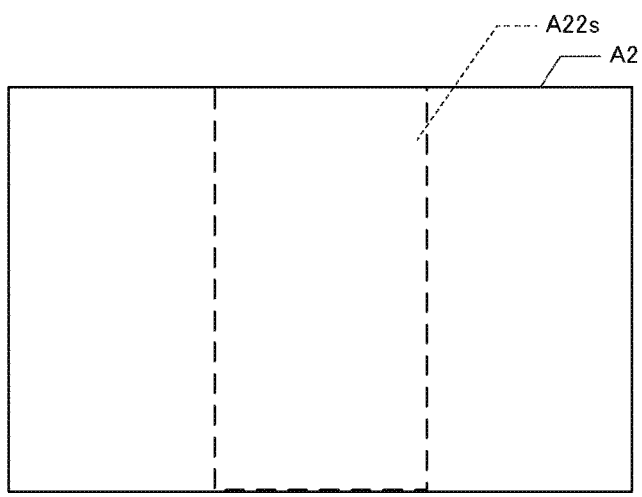
Figure 4C:
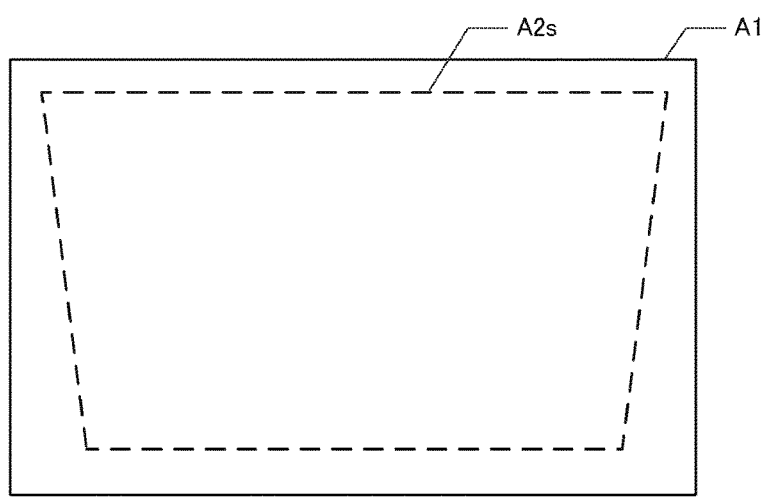

In a case in which a screen configuration for one-screen display is set and an image signal indicating an image with an aspect ratio that is different from the aspect ratio of the window image is input as illustrated in FIG. 4A, the control unit 15 sets the region A22s in which the external image A22 is drawn such that two sides of the region A22s in which the external image A22 is drawn overlap two sides of the window image, the external image A22 does not protrude from the region in which the window image is drawn, and the center of gravity of the region A22s in which the external image A22 is drawn is the same as the center of gravity of the region in which the window image is drawn, as illustrated in FIG. 4B.

3-4. Two-Screen Equal Division Display

Figure 5A:
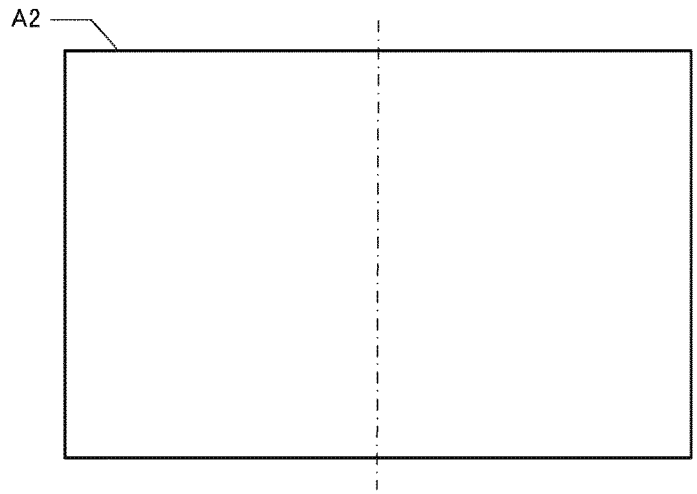
FIG. 5 is a diagram illustrating the structure of the screen according to the embodiment of the invention.

In a case in which a screen configuration for two-screen equal division display is set, the control unit 15 divides the region of the window image A2 into two equal regions in the left-right direction as represented by a one-dot chain line in FIG. 5A. Then, the control unit 15 allocates one of the left and right regions as the maximum region in which a first external image based on an image signal that is input from a first external apparatus is drawn and allocates the other region as the maximum region in which a second external image based on an image signal that is input from a second external apparatus is drawn.

Figure 5B:
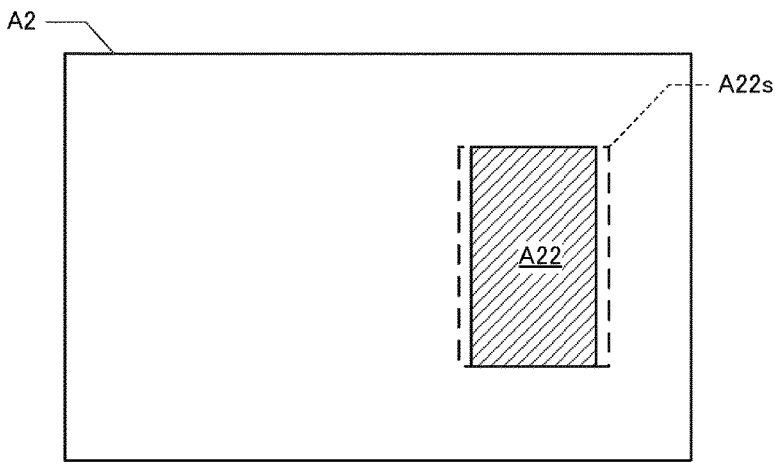

When an image signal indicating a vertically long image is input, the control unit 15 sets a region in which the external image is drawn, using a template A22s for determining a region (template region) represented by a dashed line in FIG. 5B. The template A22s determines a vertically long region that is disposed at the center of one of the left and right maximum regions in which the external image is drawn as a drawing region in which the external image is accommodated. In a case in which the template A22s and the external image have the same aspect ratio, the region in which the external image is drawn in the window image A2 is used as the region of the template A22s. As illustrated in FIG. 5B, in a case in which the template A22s and the external image A22 have different aspect ratios, a region that is accommodated in the template A22s, has the same aspect ratio as the external image A22, and has two opposite sides that overlap two opposite sides of the template A22s is set as the region in which the external image A22 is drawn in the window image A2.

Figure 5C:
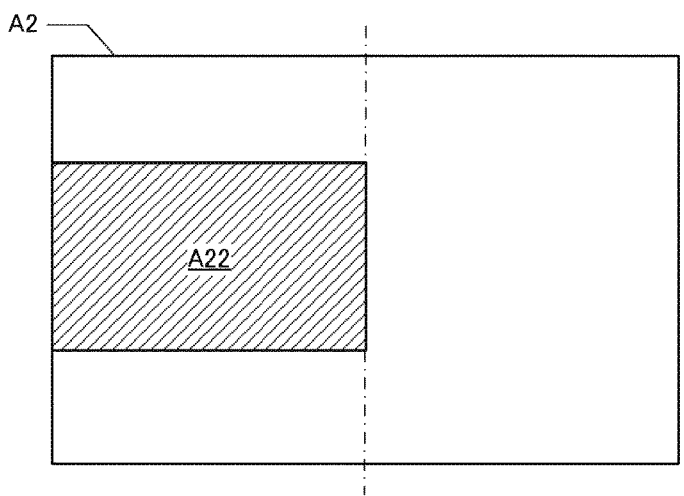

In a case in which an image signal indicating a horizontally long image is input, the control unit 15 sets the region in which the external image A22 is drawn such that two sides of the external image A22 overlap two opposite sides of the maximum region in which the external image is drawn, the external image A22 does not protrude from the maximum region in which the external image is drawn, and the center of gravity of the external image A22 is the same as the center of gravity of the maximum region in which the external image is drawn, as illustrated in FIG. 5C.

3-5. Two-Screen Unequal Division Display

Figure 6A:
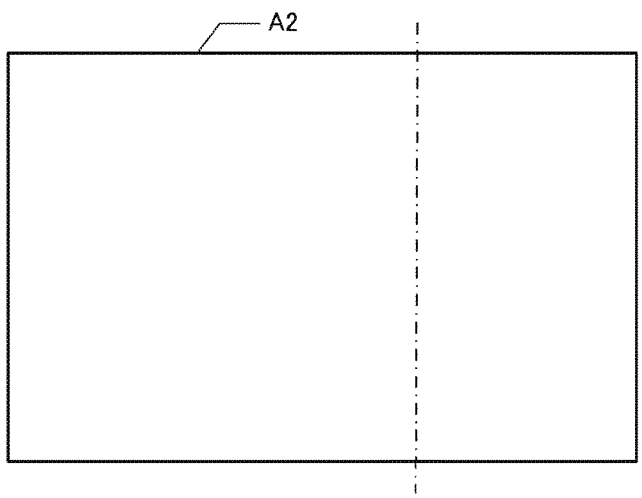
FIG. 6 is a diagram illustrating the structure of the screen according to the embodiment of the invention.

In a case in which a screen configuration for two-screen unequal division display is set, the control unit 15 divides the region of the window image A2 into two regions at a different ratio in the left-right direction, as represented by a one-dot chain line in FIG. 6A, and allocates each region as the maximum region in which the external image is drawn. The division ratio may be predetermined or may be set by the user.

Figure 6B:
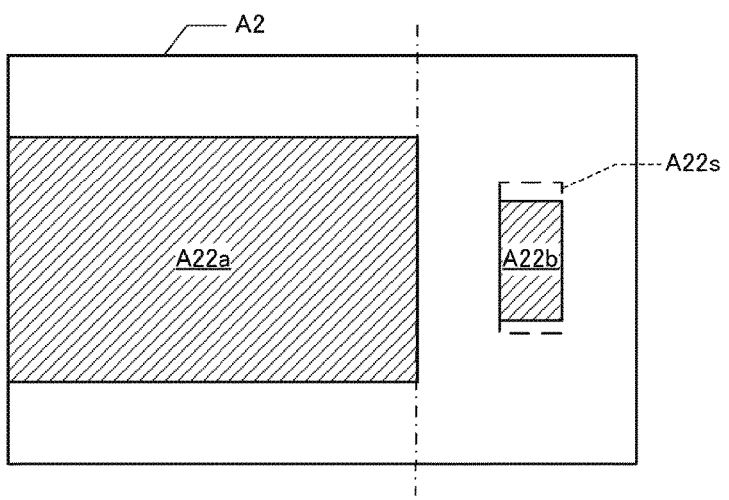

In a case in which an image signal indicating a vertically long image is input, the control unit 15 sets a region in which the external image is drawn in the maximum region in which the external image is drawn, using the template A22s. In a case in which an image signal indicating a horizontally long image is input, the control unit 15 sets, as the region in which the external image is drawn, a rectangular region that is accommodated in the maximum region in which the external image is drawn, has two opposite sides overlapping two opposite sides of the maximum region, and has the same aspect ratio as the external image. As a result, a horizontally long external image A22a and a vertically long external image A22b are drawn in the window image A2, as illustrated in FIG. 6B.

3-6. Change from First Mode to Second Mode

The projector 1 is changed from the first mode to the second mode according to a plurality of triggers which will be described below.

The first trigger is the connection of an external apparatus to the USB terminal of the image signal input unit 14. When the connection of an external apparatus to the USB terminal of the image signal input unit 14 is detected, the control unit 15 changes from the first mode to the second mode.

Figure 7A:
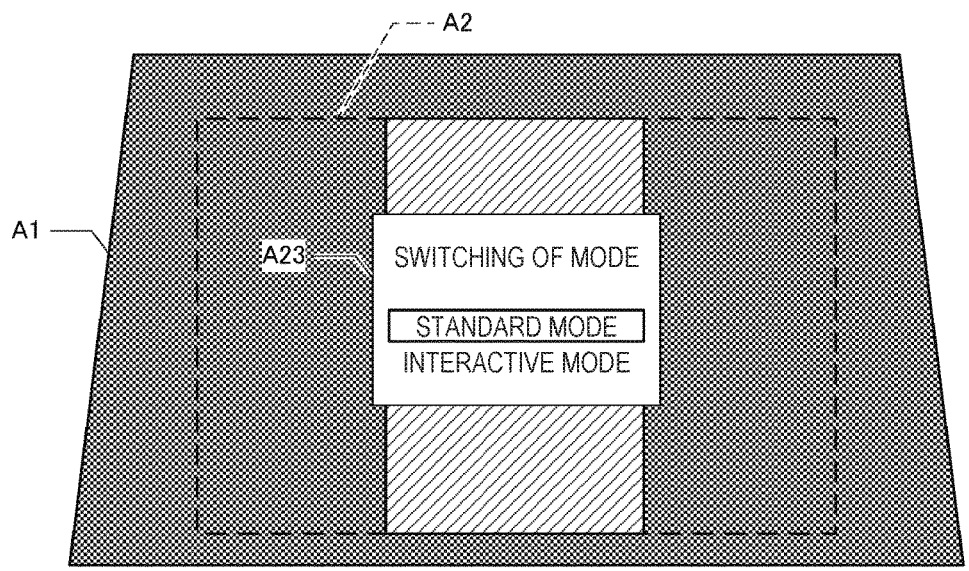
FIG. 7 is a diagram illustrating the structure of the screen according to the embodiment of the invention.

The second trigger is an operation of the OSD menu. For example, when the menu key 181 of the operating unit 18 is operated, the control unit 15 generates a window image A2 in which an OSD menu A23 for selecting the mode is drawn on the foremost side, as illustrated in FIG. 7A, and waits for the selection of an item. In the OSD menu A23, a "standard mode" indicating the first mode and an "interactive mode" indicating the second mode are disposed as menu items. When the "interactive mode" is selected by the selection key 182 and the Enter key 183 of the operating unit 18 in the first mode, the control unit 15 changes from the first mode to the second mode. That is, the selection of the "interactive mode" in the OSD menu A23 is detected as an instruction to change the mode from the first mode to the second mode and the selection key 182 and the Enter key 183 function as an operation switch for detecting the change instruction.

The third trigger is an operation of the electronic pen 23. Specifically, when the electronic pen 23 is detached from the pen holder 234, the pen holder 234 detects the detachment and notifies the control unit 15 that the electronic pen 23 has been detached. As a result, the control unit 15 changes from the first mode to the second mode. In addition, in a case in which, after the electronic pen 23 is detached from the pen holder 234, the user turns off the power switch 233, without attaching the electronic pen 23 to the pen holder 234, and then turns on the power switch 233, the control unit 15 may change from the first mode to the second mode. In this case, means for notifying the operation of turning on the power switch 233 and the operation of turning off the power switch 233 from the electronic pen 23 to the control unit 15 is required. For example, the light emitting unit 232 of the electronic pen 23 can be used as the means. In this case, the power switch 233 forms at least a portion of the change instruction detection unit.

Figure 7B:
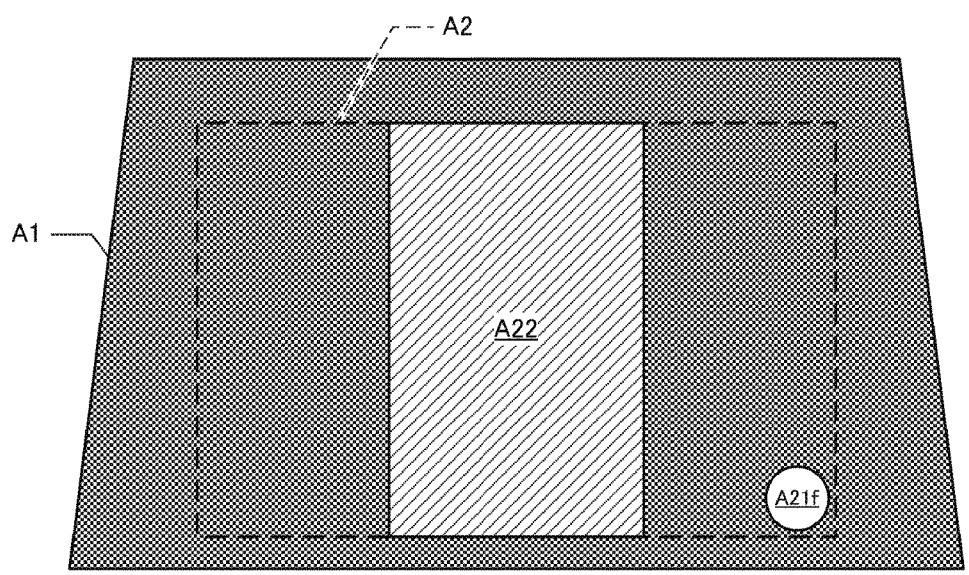

The fourth trigger is an operation for a predetermined region of the projection surface. In this case, it is necessary to operate the electronic pen 23, the receiving unit 21, and the position detection unit 22 in the first mode in order to detect an operation for the predetermined region of the projection surface in the first mode. In this case, the operation detection unit forms at least a portion of the change instruction detection unit. In addition, as illustrated in FIG. 7B, preferably, the control unit 15 draws a mode switching icon A21f in the predetermined region in the first mode such that the user can recognize the predetermined region of the projection surface. Furthermore, the user may select whether to receive an operation for the predetermined region of the projection surface as an instruction to change the mode to the second mode in the first mode.

3-7. Drawing Process in Second Mode

An external image drawing process in the second mode is the same as that in the first mode. That is, in a case in which the external image is the same, a region in which the external image is drawn does not change even if the mode is changed from the first mode to the second mode.

In the second mode, as illustrated in FIG. 1B, the control unit 15 draws the region behind the window image A2 in the projection region A1 in black and draws the region behind the external image A22 in the window image A2 in white. Therefore, when the mode is changed from the first mode to the second mode, the color of the region behind the external image A22 in the region of the window image A2 is changed from black to white.

In the second mode, the operation input image A21 corresponding to an operation for the operation region of the projection surface and the external image A22 are disposed in front of the white region behind the window image A2. The operation input image A21 is independently generated by the control unit 15 of the projector 1. Therefore, the response speed of the operation input image A21 to an operation for an operation region A24 of the projection surface is high. The resolution of the operation input image A21 is equal to the resolution of the window image A2. The control unit 15 draws, for example, various icons A21a, A21b, A21c, A21d, A21e, A21f, and A21p and the operation input object A21g corresponding to an operation for the operation region A24A through the electronic pen 23 in the region in which the operation input image A21 is drawn.

The icons A21a, A21b, A21c, A21d, and A21e indicate regions for allowing the user to select figures that are reflected as operations for the operation region of the projection surface through the electronic pen 23 in the operation input image A21. That is, when the operation position signals indicating the regions in which the icons A21a, A21b, A21c, A21d, and A21e are drawn are input from the position detection unit 22, the control unit 15 prepares the drawing process corresponding to each region. For example, when the tip of the electronic pen 23 comes into contact with the region in which the icon A21a is projected, the control unit 15 draws the trajectory of the contact of the tip of the electronic pen 23 with the operation region as the operation input object A21g on the foremost surface of the operation region. When the tip of the electronic pen 23 comes into contact with the region in which the icon A21b is projected, the control unit 15 changes the thickness of a line to be drawn in the operation input image A21. When the tip of the electronic pen 23 comes into contact with the region in which the icon A21c is projected, the control unit 15 draws a rectangle that has, as both ends of a diagonal line, a starting point and an end point of the trajectory of the contact of the tip of the electronic pen 23 with the operation region A24 on the foremost surface of the operation region. When the tip of the electronic pen 23 comes into contact with the region in which the icon A21d is projected, the control unit 15 draws an ellipse that is inscribed in a rectangle having, as both ends of a diagonal line, the starting point and the end point of the trajectory of the contact of the tip of the electronic pen 23 with the operation region A24 on the foremost surface of the operation region. When the tip of the electronic pen 23 comes into contact with the region in which the icon A21e is projected, the control unit 15 deletes the operation input object A21g corresponding to the previous operation for the operation region A24 through the electronic pen 23 on the trajectory of the contact of the tip of the electronic pen 23 with the operation region A24. In addition, during the period for which the drawing processes corresponding to the icons A21a, A21b, A21c, A21d, and A21e are prepared or performed, the control unit 15 performs a drawing process for highlighting the corresponding icons A21a, A21b, A21c, A21d, and A21e. In the second mode, when the tip of the electronic pen 23 comes into contact with the region in which the mode switching icon A21f is projected, the control unit 15 changes to the first mode.

3-8. Operation Region

Figure 8A:
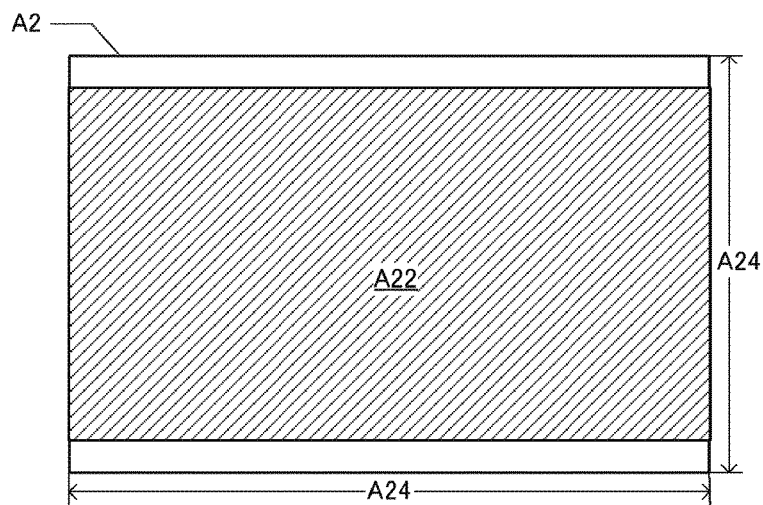
FIG. 8 is a diagram illustrating the structure of the screen according to the embodiment of the invention.

In the screen configuration for one-screen display, in a case in which the external image is longer than the window image A2 in the vertical direction as illustrated in FIG. 4B, two upper and lower sides of the drawing region A22s of the external image overlap two upper and lower sides of the window image A2. Therefore, the entire window image A2 is set as the operation region. In the screen configuration for one-screen display, in a case in which the external image A22 is longer than the window image A2 in the horizontal direction as illustrated in FIG. 8A, two left and right sides of the drawing region of the external image A22 overlap two left and right sides of the window image A2. Therefore, the entire window image A2 is set as the operation region A24. Even in a case in which the window image A2 and the external image have the same aspect ratio, the entire window image A2 is set as the operation region. That is, in the case of the screen configuration for one-screen display, the control unit sets the entire region of the window image A2 as the operation region.

Figure 8B:
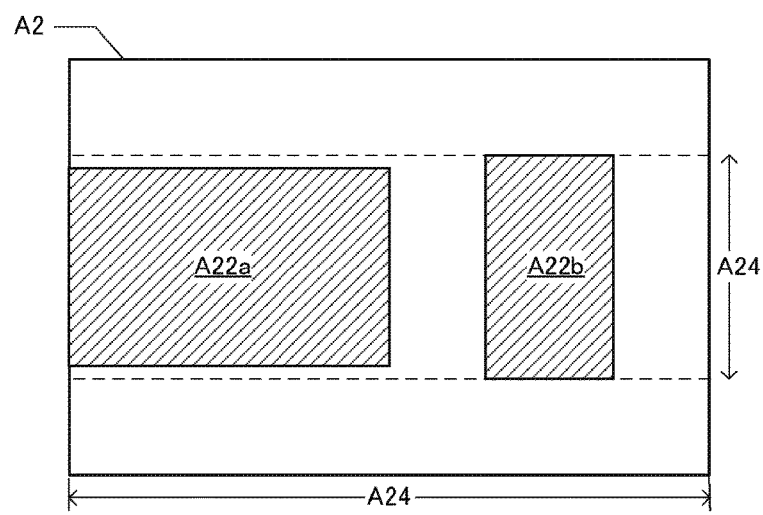
Figure 8C:
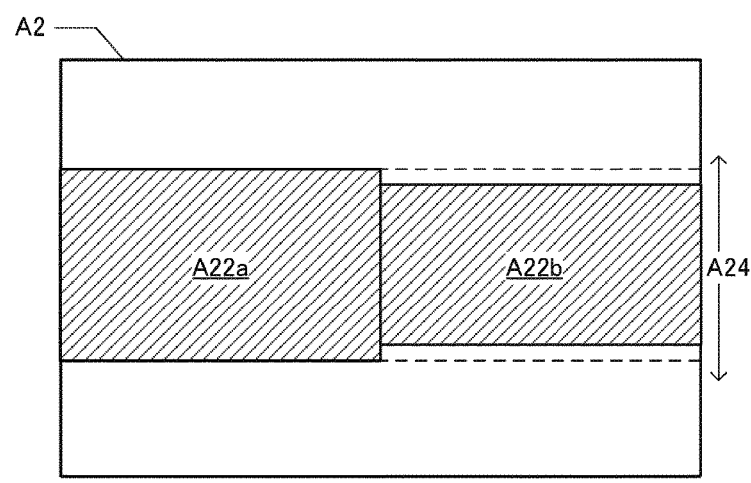

In a case in which the screen configuration for two-screen equal division display or two-screen unequal division display is set, the control unit 15 sets, as the operation region A24, a rectangular region that has two upper and lower sides which overlap two upper and lower sides of the longer of two external images A22a and A22b in the vertical direction and two left and right sides which overlap two left and right sides of the window image A2, as represented by dashed lines in FIGS. 8B and 8C, is set as the operation region A24. Therefore, in the case of two-screen equal division display or two-screen unequal division display, the operation region A24 is narrower than the window image A2. Even if a region outside the operation region A24 on the projection surface is operated, that is, even if an operation position signal corresponding to the region outside the operation region A24 is input, the control unit 15 does not draw a figure corresponding to the operation position signal on the window image A2.

Figure 9:
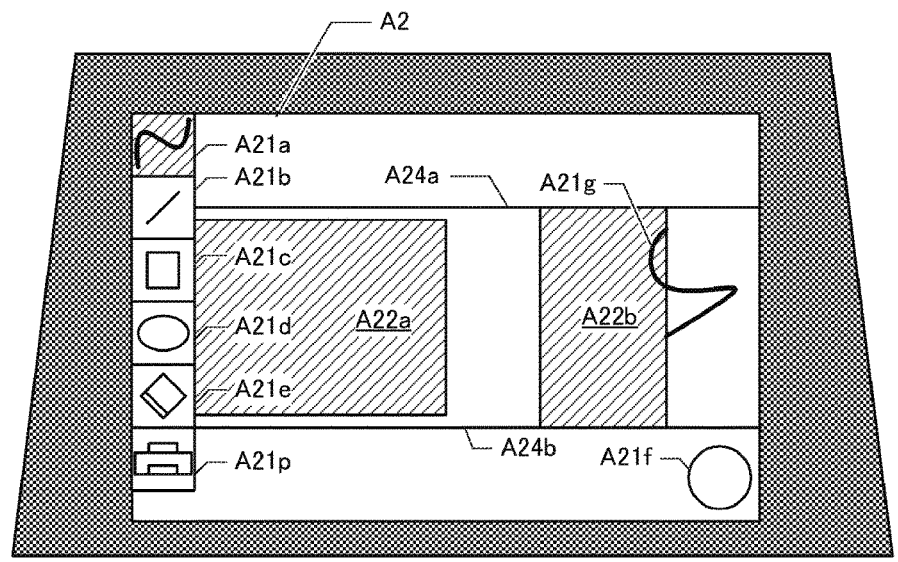
FIG. 9 is a diagram illustrating the structure of the screen according to the embodiment of the invention.

As described above, in both the first mode and the second mode, the control unit 15 draws the region behind the window image A2 in the projection region A1 in black. The control unit 15 draws the region behind the external image in the window image A2 in black in the first mode and draws the region in white in the second mode. Therefore, when the mode is changed from the first mode to the second mode, the left and right boundary lines of the operation region are projected as the boundary between the black region and the white region, as illustrated in FIGS. 1B and 9.

In a case in which the screen configuration for two-screen equal division display or two-screen unequal division display is set, the operation region is narrower than the region in which the window image A2 is drawn in the vertical direction. Therefore, in the second mode, the control unit 15 draws an upper boundary line A24a and a lower boundary line A24b of the operation region on the window image A2, as illustrated in FIG. 9. When the mode is changed from the first mode to the second mode, the boundary lines appear on four sides of the operation region. The boundary lines A24a and A24b may be any color that is different from the color of the region behind the window image A2.

4. Printing of Window Image

In a case in which a printing instruction is input in the second mode, the control unit 15 can output print data for printing the window image. The icon A21p illustrated in FIG. 9 indicates a region with which the tip of the electronic pen 23 comes into contact on the projection surface in order to input a printing instruction. That is, when an operation position signal indicating the region in which the icon A21p is drawn is input from the position detection unit 22, the control unit 15 receives the input as the printing instruction. In this case, the electronic pen 23 functions as a printing instruction input unit.

When a printing instruction is input in the second mode, the control unit 15 outputs print data on the basis of the window image A2 which has not been subjected to trapezoidal correction. Specifically, the control unit 15 converts bitmap image data indicating the window image A2 into print data with a format that can be processed by a printer corresponding to the projector 1 and outputs the print data. The print data may be directly output to the printer connected to the projector 1 or may be output to a removable memory. In addition, the print data may have a format unique to the printer or a general-purpose format such as PDF.

In the second mode, the icons A21a, A21b, A21c, A21d, A21e, A21f, and A21p, the boundary lines A24a and A24b, the characters or the figure A21g corresponding to an operation for the operation region, and the region behind the external image A22 in the window image A2 are drawn in white. In a case in which printing is performed on the basis of the output print data obtained by converting the bitmap image data indicating the window image A2, the printer does not eject ink or toner to a region other than the icons A21a, A21b, A21c, A21d, A21e, A21f, and A21p, the characters or the figure A21g corresponding to the operation for the operation region A24A, and the external image A22. For example, in a case in which printing is performed by an ink jet printer, a print duty for the region is zero. In addition, bitmap image data indicating the window image A2 in which the icons A21a, A21b, A21c, A21d, A21e, A21f, and A21p and the boundary lines A24a and A24b are excluded from a print target may be converted into print data.

According to the above-described embodiment, the operation region is a rectangle of which the boundary can be recognized as the extension lines of the sides of the external image and the boundary lines of the operation region are displayed on the screen. Therefore, it is easy for the user to recognize the operation region on the screen. In addition, in the second mode in which the external image and the operation input image are projected, the color of the region behind the external image in the operation region is different from black in the first mode. Therefore, it is easy for the user to recognize the operation region in which an operation for the projection surface is reflected in the projection image. In particular, the color of the region behind the external image in the operation region is white that reminds the user of a white board or white paper in the second mode. Therefore, it is easier for the user to recognize the operation region, in which an operation for the projection surface is reflected in the projection image, on the projection surface. Furthermore, the boundary lines of the operation region are projected in the window image. Therefore, it is easier for the user to recognize the operation region, in which an operation for the projection surface is reflected in the projection image, in the window image on the projection surface. In a case in which the external apparatus that inputs an image signal is switched, the drawing region and the operation region are reset and the boundary lines corresponding to the reset operation region are projected. Therefore, even if the external apparatus is switched and the aspect ratio of the external image or the screen configuration is changed, it is easy for the user to recognize the operation region on the projection surface.

With a change to the second mode, the projection form of the region behind the external image in the operation region is changed. Therefore, it is easy for the user to recognize the region, in which an operation for the projection surface is reflected in the projection image, on the projection surface. When an external apparatus is connected to the USB terminal, the mode is changed to the second mode. Therefore, it is possible to reduce the number of operations required to the user to change the projection form of a region other than the region in which the external image is disposed in the operation region. In addition, since the projection form of the region behind the external image in the operation region is changed by an operation for the icons on the projection surface, the user can change the projection form of the region behind the external image in the operation region without moving away from the projection surface, which is convenient. In addition, the projection form of the region behind the external image in the operation region can be changed by the operation of turning on the power switch of the electronic pen 23. Therefore, it is possible to reduce the number of operations of the user.

5. Other Embodiments

The technical scope of the invention is not limited to the above-described embodiment and various modifications and changes of the invention can be made without departing from the scope and spirit of the invention.

For example, in the second mode, the boundary lines of the operation region may be drawn on four sides of the window image. In a case in which the outside of the window image is drawn in the same form as the operation region, it is particularly effective to draw the boundary lines of the operation region on four sides of the window image. In addition, in the second mode, the outside of the operation region in the window image may be drawn in black. In this case, the boundary lines of the operation region are drawn as the boundary between a black region and a white region. In the second mode, the region behind the external image in the operation region may be drawn in black, similarly to the first mode. In this case, the boundary lines of the operation region are drawn in colors other than black, which makes it possible for the user to recognize the operation region on the projection surface.

Figure 10:
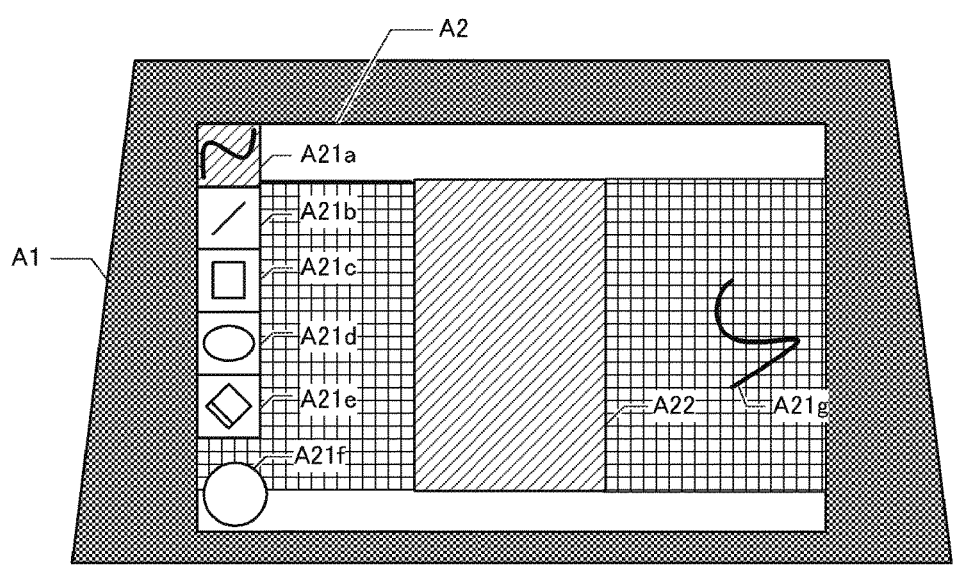
FIG. 10 is a diagram illustrating the structure of the screen according to the embodiment of the invention.

In the second mode, the operation region may be drawn in a light color except white or may be drawn in colors other than monochrome. For example, the operation region may be drawn in a color that can be printed by the printer with one type of color ink or color toner and has a print duty lower than that in the first mode. In addition, the form of the operation region in the second mode may be different from the form of the operation region in the print data which is output in a case in which a printing instruction has been input. For example, a method may be used which draws grids in the operation region in the second mode, as illustrated in FIG. 10, and does not draw the grids in the operation region in the print data.

For example, when the projection form of the region behind the external image in the operation region is changed from the first mode, the projection form may not be changed at the time when the mode is changed from the first mode to the second mode and may be changed by any trigger that is provided during the period for which the projector is operating in the second mode. For example, the projection form of the region behind the external image in the operation region may not be changed from the first mode at the time when the mode is changed from the first mode to the second mode by the operation of the OSD menu or the connection of an external apparatus to the USB terminal. The projection form of the region behind the external image in the operation region may be changed from the first mode at the time when the power switch of the electronic pen is operated in the second mode, at the time when the electronic pen is detached from the pen holder in the second mode, at the time when an operation for an arbitrary region in which an operation for the projection surface can be detected is initially performed in the second mode, or at the time when an operation for a predetermined region indicated by an icon is performed in the second mode.

For example, when the boundary lines of the operation region are projected, the boundary lines may not be projected at the time when the mode is changed from the first mode to the second mode and may be projected by any trigger that is provided to project the boundary lines during the period for which the projector is operating in the second mode. For example, the boundary lines may not be projected at the time when the mode is changed from the first mode to the second mode by the operation of the OSD menu or the connection of an external apparatus to the USB terminal and may start to be projected at the time when the power switch of the electronic pen is operated in the second mode, at the time when the electronic pen is detached from the pen holder in the second mode, at the time when an operation for an arbitrary region in which an operation for the projection surface can be detected is initially performed in the second mode, or at the time when an operation for a predetermined region indicated by an icon is performed in the second mode.

For example, the operation region may be inscribed in the window image or may not be inscribed in the window image. A rectangular region of which four sides overlap four sides of the window image may be set as the operation region. A rectangular region of which two upper and lower sides overlap two upper and lower sides of the window image may be set as the operation region. A rectangular region of which three sides except one side in the vertical direction or the horizontal direction overlap the sides of the window image may be set as the operation region. A rectangular region of which four sides are disposed inside four sides of the window image may be set as the operation region. For example, a rectangular region of which only one side overlaps one side of the external image may be set as the operation region or a rectangular region of which two adjacent sides overlaps two adjacent sides of the external image (that is, the regions have one common vertex) may be set as the operation region.

For example, a laser curtain or light with a wavelength other than the infrared wavelength may be used as means for detecting an operation for the projection surface. In addition, the transmitting unit having a function of transmitting an operation signal, such as the electronic pen, may not be used and a unit that detects the infrared wavelength light which has been emitted from the laser curtain and then reflected from a finger and detects an operation for the projection surface may be used.

For example, in order to project an image, one liquid crystal panel may be used to modulate light, a reflective liquid crystal panel, may be used to modulate light, or a digital mirror device (DMD) may be used to modulate light. For example, a convex mirror may be used to enlarge a projection image and to project the enlarged projection image, or no mirror may be used. In addition, the invention may be applied to a display device such as a touch panel display.

REFERENCE SIGNS LIST

1: ROJECTOR
1a: FIRST HOUSING
1b: SECOND HOUSING
10: LIQUID CRYSTAL LIGHT BULB
10a: LIQUID CRYSTAL PANEL
10b: LIQUID CRYSTAL PANEL
10c: LIQUID CRYSTAL PANEL
11: LIQUID CRYSTAL DRIVING UNIT
12: OSD PROCESSING UNIT
13: IMAGE SIGNAL PROCESSING UNIT
14: IMAGE SIGNAL INPUT UNIT
15: CONTROL UNIT
16: LIGHT SOURCE DRIVING UNIT
17: PROJECTION LIGHT SOURCE
18: OPERATING UNIT
19: POWER SUPPLY UNIT
21: RECEIVING UNIT
22: POSITION DETECTION UNIT
23: ELECTRONIC PEN
151: EXTERNAL STORAGE UNIT
181: MENU KEY
182: SELECTION KEY
183: ENTER KEY
184: POWER SWITCH
231: TOUCH SENSOR
232: LIGHT EMITTING UNIT
233: POWER SWITCH
234: PEN HOLDER
A1: PROJECTION REGION
A2: WINDOW IMAGE
A21: OPERATION INPUT IMAGE
A21a: ICON
A21b: ICON
A21c: ICON
A21d: ICON
A21e: ICON
A21f: MODE SWITCHING ICON
A21g: OPERATION INPUT OBJECT
A21p: ICON
A22: EXTERNAL IMAGE
A22a: EXTERNAL IMAGE
A22b: EXTERNAL IMAGE
A22s: TEMPLATE
A23: MENU
A24: OPERATION REGION
A24a: BOUNDARY LINE
A24b: BOUNDARY LINE

The entire disclosure of Japanese Patent Application No. 2014-075191, filed Apr. 1, 2014 and No. 2014-075195, filed Apr. 1, 2014 are expressly incorporated by reference herein.

The invention claimed is:

1. An interactive display method comprising:
receiving an image signal from an external apparatus;
displaying an image on a screen on the basis of a display signal by an interactive display device;
detecting an operation for an operation region of the screen;
setting a rectangle, in which an external image based on the image signal is accommodated and of which at least one side overlaps a side of the external image, as the operation region according to the external image;
outputting the display signal for displaying the external image, wherein a region outside the operation region is displayed in a first color and the operation region is displayed in a second color, such that
when the interactive display device is in a first mode in which the external image is projected on the screen without projection of an operation input object corresponding to the operation for the operation region, the first color and the second color are the same, and
when the interactive display device is in a second mode in which the external image is combined with the operation input object, the first color and the second color are different;
in response to changing a mode of the interactive display device from the first mode to the second mode, automatically changing the second color to be different from the first color; and
in response to changing the mode of the interactive display device from the second mode to the first mode, automatically changing the second color to be the same as the first color.

2. The interactive display method according to claim 1, wherein,
in the outputting of the display signal, a boundary of the operation region is drawn and the display signal for displaying the boundary and the external image is output.

3. The interactive display method according to claim 1, wherein,
in the outputting of the display signal, the operation input object corresponding to the operation for the operation region is drawn and the display signal for displaying the operation input object and the external image is output.

4. The interactive display method according to claim 1, wherein, in a case in which the external apparatus that inputs the image signal is switched, in the setting of the rectangle, the operation region is reset.

5. The interactive display method according to claim 1, wherein,
in the setting of the rectangle, the external image is disposed in a rectangular template region and a rectangle of which at least one side overlaps a side of the template region is set as the operation region according to the external image.

6. The interactive display method according to claim 1, wherein, in the displaying of the image, in the second mode, the image in which a projection form of the operation region is different from that in the first mode is displayed.

7. An interactive display device comprising:
an image signal input unit that receives an image signal from an external apparatus;
a display unit that displays an image on a screen on the basis of a display signal;
an operation detection unit that detects an operation for an operation region of the screen;
a region setting unit that sets a rectangle, in which an external image based on the image signal is accommodated and of which at least one side overlaps a side of the external image, as the operation region according to the external image;
a drawing unit that outputs the display signal for displaying the external image, wherein a region outside the operation region is displayed in a first color and the operation region is displayed in a second color; and
a control unit that changes a mode of the interactive display device between (i) a first mode in which the external image is projected on the screen without projection of an operation input object corresponding to the operation for the operation region and (ii) a second mode in which the external image is combined with the operation input object, such that
when the interactive display device is in the first mode, the first color and the second color are the same, and
when the interactive display device is in the second mode, the first color and the second color are different, wherein
in response to the control unit changing the mode of the interactive display device from the first mode to the second mode, the second color is automatically changed to be different from the first color, and
in response to the control unit changing the mode of the interactive display device from the second mode to the first mode, the second color is automatically changed to be the same as the first color.

8. The interactive display device according to claim 7, wherein, in the second mode, the control unit draws the image in which a projection form of the operation region is different from that in the first mode.

9. The interactive display device according to claim 8, wherein,
in the second mode, the control unit draws the image in which the second color is white.

10. The interactive display device according to claim 8, further comprising:
a printing instruction input unit that inputs a printing instruction,
wherein, in the second mode, when the printing instruction is input, the control unit outputs print data for printing the image in which the second color is white.

11. The interactive display device according to claim 8, further comprising:
a printing instruction input unit that inputs a printing instruction,
wherein, in the second mode, when the printing instruction is input, the control unit outputs print data for printing the image in which the operation region has the second color such that a print duty of the operation region is lower than that in the first mode.

12. The interactive display device according to claim 8, wherein,
when the mode is changed from the first mode to the second mode, the control unit changes the projection form of the operation region from the first mode.

13. The interactive display device according to claim 8, wherein
the image signal input unit includes a USB terminal, and
when a connection to the USB terminal is detected, the control unit changes the projection form of the operation region from the first mode.

14. The interactive display device according to claim 8, further comprising:
a change instruction detection unit that detects a change instruction to change the mode from the first mode to the second mode,
wherein, when the change instruction is detected, the control unit changes the projection form of the operation region from the first mode.

15. The interactive display device according to claim 14, wherein
the change instruction detection unit detects an operation for a predetermined region of the screen as the change instruction.

16. The interactive display device according to claim 14, wherein
the change instruction detection unit includes a switch that detects the change instruction.

17. The interactive display device according to claim 16, wherein
the operation detection unit includes a transmitting unit that transmits an operation signal when contact with the screen is made, a receiving unit that receives the operation signal, and a position detection unit that detects a position of the transmitting unit when the operation signal is received, and
the switch is provided in the transmitting unit.

18. The interactive display device according to claim 17, wherein
the switch is a power switch of the transmitting unit.

19. The interactive display device according to claim 16, wherein
the switch is an operation switch of an OSD menu.

* * * * *